Figure 1:
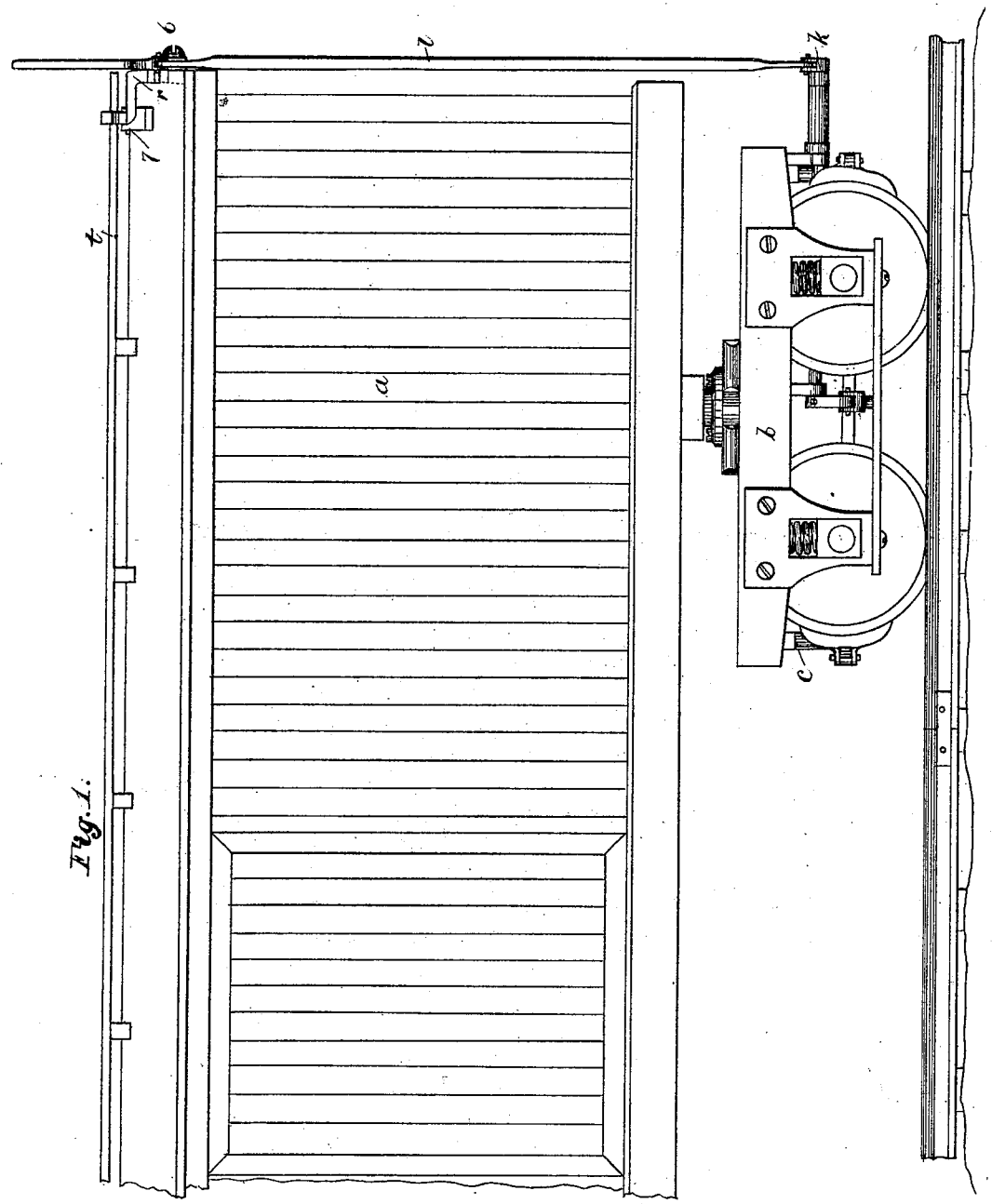

(No Model.) 3 Sheets—Sheet 1.

G. W. FRIEL.
CAR BRAKE.

No. 253,031. Patented Jan. 31, 1882.

Witnesses.
L. F. Connor.
B. J. Noyes

Inventor.
George W. Friel
by Crosby & Gregory
Attys (No Model.) 3 Sheets—Sheet 2.

G. W. FRIEL.
CAR BRAKE.

No. 253,031. Patented Jan. 31, 1882.

Witnesses. Inventor.
George W. Friel
by Crosby & Gregory
Attys (No Model.)
3 Sheets—Sheet 3.
G. W. FRIEL.
CAR BRAKE.
No. 253,031. Patented Jan. 31, 1882.
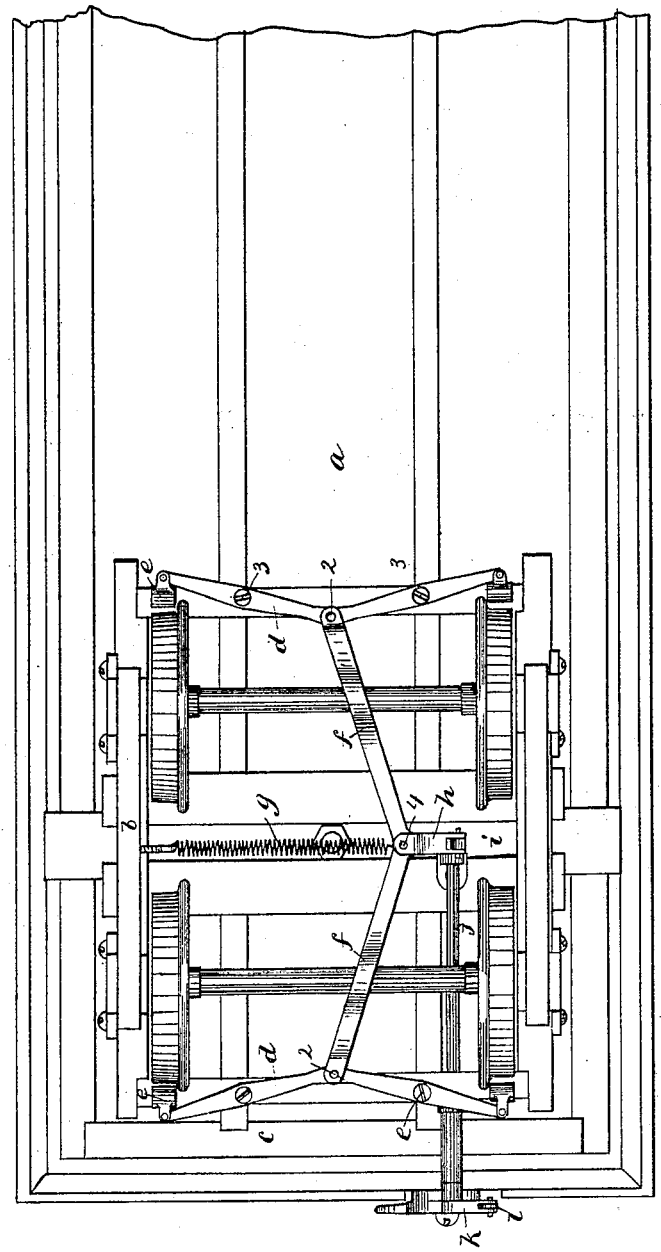
Witnesses.
Inventor.
George W. Friel
by Crosby & Gregory
Attys.

UNITED STATES PATENT OFFICE.

GEORGE W. FRIEL, OF ROCKLAND, MASSACHUSETTS.

CAR-BRAKE.

SPECIFICATION forming part of Letters Patent No. 253,031, dated January 31, 1882.

Application filed June 25, 1881. (No model.)

*To all whom it may concern:*

Be it known that I, GEORGE W. FRIEL, of Rockland, county of Plymouth, State of Massachusetts, have invented an Improvement in Brakes for Railway-Cars, of which the following description, in connection with the accompanying drawings, is a specification.

My invention relates to brakes for railway-cars, and has for its object to produce a brake that can be automatically applied at the will of the operator on the car, it being shown as used in connection with freight-cars, and so arranged that the operator in running along the tops of the cars can cause the brake to be applied by the action of his foot as he passes across from one car to the other, and without stopping in his movement. The brake-shoes at each end of the truck are mounted upon the ends of levers jointed together at their other ends and acted upon at their joint by thrust-bars properly connected together, end to end, to produce a toggle-joint action, and actuated by a powerful spring to bring the said bars into line with one another, and thus cause them to act powerfully at the jointed ends of the brake-levers to press the brake-shoes against the wheels. The joint of the said thrust-bars is also connected with a crank on a rock-shaft, provided with another crank at the end of the under side of the car-body, connected by a link with a lever at the top of the car, which lever is intended to be actuated by the brakeman to break the joint of the said toggle-jointed thrust-bars and act in opposition to the actuating-spring to withdraw the brake-shoes from the wheels, the operator thus exerting his power to take off the brakes, instead of in setting them up, as is usually practiced. A locking device (shown as a spring-actuated pawl or dog) engages the said lever and holds it in position to keep the brake off or out of contact with the wheels, and the said dog has a tripping-projection extending up through the platform upon which the brakeman passes over the car, so that he can by treading on the said projections in passing release the lever, whereupon the brake is at once automatically applied by the force of the actuating-spring. The connections from the actuating-lever to the toggle-jointed thrust-bars and brakes proper is positive, so that the operator may by means of the said lever apply the brake in case the actuating-spring should become inoperative, or the said operator may employ his force in addition to that of the said spring, if desired.

Figure 2:
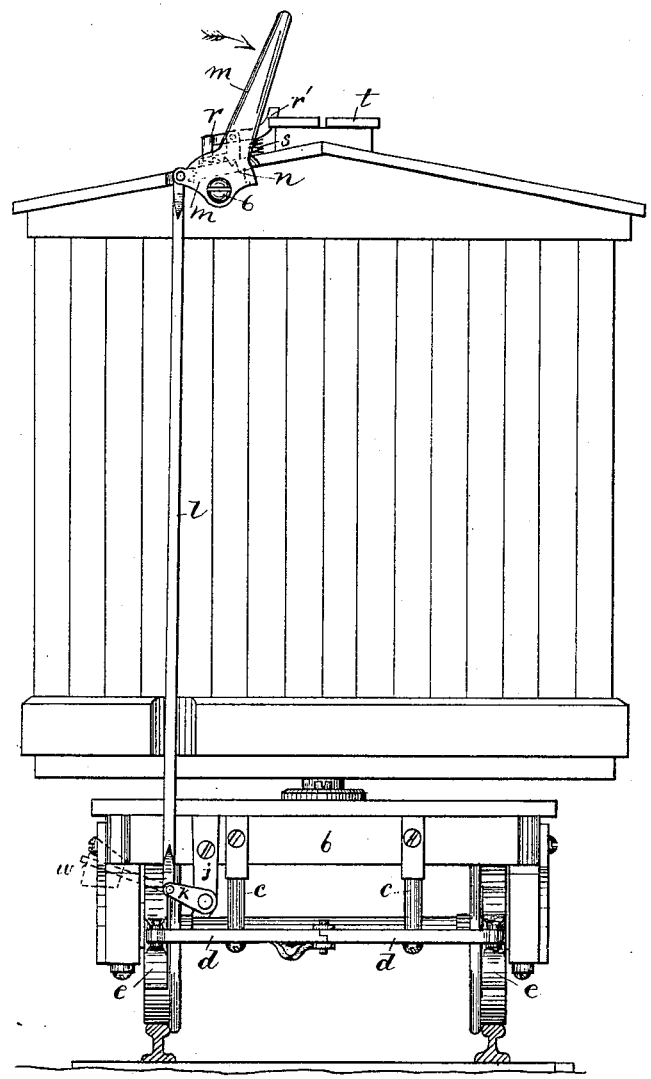

Figure 1 is a side elevation of a portion of a car provided with my automatic brake; Fig. 2, an end elevation thereof; and Fig. 3 an under side view, showing the arrangement of the levers and thrust-bars.

The car-body $a$ and truck-frame $b$ may be of any usual construction, the said truck frame being provided with rigid downwardly-projecting arms $c$, at the end of which are pivoted the brake-levers $b$, having their inner ends jointed together at 2, and carrying at their outward ends the usual brake-shoes, $e$, in proper position to act upon the treads of the wheels when the said levers are turned on their pivots 3 at the ends of the arms $c$.

Connected with the jointed inner ends, 2, of the levers $d$ are two thrust-bars, $f$, jointed together end to end at 4, and of such length that when brought into line with one another they will force the joints 2 of the pairs of levers $d$ at the opposite ends of the truck apart, turning the said levers on their pivots 3 and pressing the shoes $e$ against the wheels. An actuating-spring, $g$, connected at one end with the joint 4 of the thrust-bars $f$ and at its other end with the frame-work $b$ of the truck, acts to draw the said thrust-bars into line with one another, to thereby apply the brakes, as just described. The joint 4 of the thrust-bars is also connected by a link, $h$, with a crank, $i$, upon a rock-shaft, $j$, extending to the end of the car, where it is provided with another crank, $k$, connected by a link, $l$, with the short arm of a handled lever, $m$, pivoted at 6 upon the frame-work of the car, and provided with a ratchet, $n$. (Shown in dotted lines, Fig. 2.) By this arrangement, when the lever $m$ is turned in the direction of the arrow, Fig. 2, it causes the rock-shaft $j$ to turn and draw the link $h$ and joint 4 of the thrust-bars $f$ in opposition to the actuating-spring $g$, thus breaking the joint of the said thrust-bars and removing them from their position in line with one another, to thereby draw the joints 2 of the lever $d$ at the ends of the truck together and remove the brake-shoes $e$ from the wheels, as shown in Fig. 3.

A dog, $r$, pivoted at 7 upon the top of the car, is normally pressed by a spring, s, into engagement with the ratchet n upon the lever m, so that when the said lever is turned in the direction of the arrow, Fig. 2, it is locked by the said dog and prevented from returning under the action of the actuating-spring g to apply the brake.

The end r' of the locking device or dog r is extended up through the platform t at the top of the car, over which the brakeman moves in passing from one car to another, thus forming a tripping-projection, so that the brakeman, in running from one car to another, by putting his foot upon the said projection r' will disengage or unlock the lever m, when the brake will be immediately applied by the automatic action of the spring g.

If desired, the operator might positively turn the lever m in the direction opposite to the arrow, Fig. 2, while holding the dog r disengaged therefrom to thus apply the brake in case the spring g fails to operate or was not sufficiently strong to bring the bars f fully in line, and the teeth of the ratchet n, on the side toward the point of the arrow, Fig. 2, may be turned in the opposite direction, so that the dog, in acting on these teeth, will hold the brake applied in case the bars f were not brought wholly into line.

A weight might be employed instead of the actuating-spring g, it being, for example, placed at the end of the crank k, or of an extension thereof, as shown in dotted lines at w, Fig. 2.

I am aware that it is not new to provide each car with an actuator to apply the brakes, except when the force of the said actutor is neutralized or overcome by an external force, which thus removes the pressure of the brakes from the wheels instead of applying it thereto.

I claim—

1. The pivoted brake-levers provided with brake-shoes at one end and the toggle-jointed thrust-bars, connected with the other ends thereof, combined with the actuating spring or weight to draw the said thrust-bars into line and apply the brakes, substantially as described.

2. The pivoted brake-levers provided with brake-shoes at one end thereof, and the toggle-jointed thrust-bars connected with the other ends of the said levers, combined with the actuating-lever and connecting mechanism between it and the said thrust-bars, substantially as and for the purpose set forth.

3. The toggle-jointed thrust-bars and actuating-spring, combined with the cranked rock-shaft connected with the joint of the said bars, and the link and handled lever to operate the said shaft, substantially as described.

4. The brake-levers and toggle-jointed thrust-bars and their actuating-spring, combined with the actuating-lever and connecting mechanism between it and the said bars, and the locking device therefor, substantially as described.

5. The brake-shoes and their operating mechanism and actuator therefor, combined with the actuating-lever, arranged, as described, to act in opposition to the said actuator, and the locking device with its tripping-projection located, as set forth, to be tripped by the operator in passing, whereby the actuator is permitted to automatically apply the brakes, substantially as described.

In testimony whereof I have signed my name to this specification in the presence of two subscribing witnesses.

GEORGE W. FRIEL.

Witnesses:
CHAS. T. STETSON,
WILLIAM H. RAND.